United States Patent [19]

Nilssen

[11] Patent Number: 5,039,919

[45] Date of Patent: Aug. 13, 1991

[54] CONTROL ARRANGEMENT FOR ELECTRONIC BALLAST

[76] Inventor: Ole K. Nilssen, Caesar Dr., Barrington, Ill. 60010

[21] Appl. No.: 511,950

[22] Filed: Apr. 16, 1990

Related U.S. Application Data

[63] Continuation of Ser. No. 300,579, Jan. 23, 1989, abandoned, which is a continuation-in-part of Ser. No. 80,865, Aug. 3, 1987, Pat. No. 4,819,146.

[51] Int. Cl.[5] .................. H05B 37/02; H05B 39/04; G05F 1/00; H02M 7/5387
[52] U.S. Cl. .................... 315/209 R; 363/98; 363/132; 315/DIG. 4; 315/DIG. 7; 315/307; 315/311; 315/208; 315/219
[58] Field of Search .............. 315/DIG. 7, 307, 311, 315/209 R, 208, 219, 291, 307, DIG. 4; 363/98, 132, 74, 95, 131, 136; 361/45, 42, 44, 46

[56] References Cited

U.S. PATENT DOCUMENTS

| | | | |
|---|---|---|---|
| 4,330,736 | 5/1982 | Perper | 315/DIG. 7 |
| 4,538,095 | 8/1985 | Nilssen | 315/DIG. 7 |
| 4,613,934 | 9/1986 | Pacholok | 315/DIG. 7 |
| 4,651,271 | 3/1987 | Grace | 363/132 |
| 4,684,850 | 8/1987 | Stevens | 315/222 |
| 4,719,390 | 1/1988 | Sairanen | 315/DIG. 7 |
| 4,727,470 | 2/1988 | Nilssen | 363/98 |
| 4,819,146 | 4/1989 | Nilssen | 363/98 |

Primary Examiner—Eugene R. LaRoche
Assistant Examiner—Michael B. Shingleton

[57] ABSTRACT

A self-oscillating half-bridge inverter is powered from a power-line-operated DC voltage source by way of an EMI filter. The inverter is loaded by way of a series-tuned high-Q LC circuit connected across its output. A pair of fluorescent lamps is series-connected across the tank capacitor of the LC circuit. The inverter has two bipolar transistors, each driven by an associated saturable current transformer that provides for a transistor ON-time dependent upon the magnitude of an associated bias voltage. One of the transistors has a control arrangement connected in circuit with its associated saturable transformer and operative to control the magnitude of its associated bias voltage. As the magnitude of this bias voltage is controlled, the magnitude of the voltage across the tank-capacitor, as well as of the current available therefrom, is correspondingly controlled. The magnitude of the bias voltage is automatically controlled as a function of: (a) the magnitude of the inverter's output current, (b) the magnitude of the voltage present across the tank-capacitor, (c) the magnitude of the current flowing through the lamps, (d) the setting of an adjustment means operative to adjust the amount of light output, (e) a temperature associated with the inverter, and (f) the magnitude of any ground-fault current that might be flowing.

45 Claims, 1 Drawing Sheet

CONTROL ARRANGEMENT FOR ELECTRONIC BALLAST

RELATED APPLICATION

Instant application is a Continuation-in-Part of application Ser. No. 07/080,865 filed Aug. 3, 1987, now U.S. Pat. No. 4,819,146.

BACKGROUND OF THE INVENTION

1. Field of the Invention

The present invention relates to series-resonance-loaded inverters having ground-fault-protection and EMI filtering, particularly as used for powering gas discharge lamps.

2. Description of Prior Art

Ballasts with built-in ground-fault-protection means have been previously described, such as in U.S. Pat. No. 4,563,719 to Nilssen.

Ballasts having built-in EMI filtering means also have been previously described, such as in U.S. Pat. No. 4,684,850 to Stevens.

Ballasts using a series-resonance-loaded output have also been previously described, such as in U.S. Pat. No. 4,370,600 to Zansky.

In an inverter where a gas discharge lamp load is parallel-connected across the tank capacitor of a high-Q LC circuit that is resonantly series-excited by a high-frequency voltage output of the inverter, it is necessary to provide some means to protect against the high currents and voltages resulting due to so-called Q-multiplication whenever the lamp load is removed or otherwise fails to constitute a proper load for the LC circuit.

In U.S. Pat. No. 4,370,600 to Zansky, circuit protection is provided by way of providing to the LC circuit an alternative load in the form of a voltage-clamping means; which voltage-clamping means acts to load the LC circuit during any period when the lamp does not constitute a proper load therefor.

The voltage-clamping is accomplished by rectifying the Q-multiplied voltage output of the LC circuit and by applying the resulting DC output to the inverter's DC power source.

However, during any period when voltage-clamping does occur, a relatively large amount of power circulates within the electronic ballast means: from the inverter's output, through the LC circuit, and back into the inverter's DC power source by way of the voltage-clamping means.

SUMMARY OF THE INVENTION

Objects of the Invention

One object of the present invention is that of providing for a cost-effective power supply means, especially as used for powering a gas discharge lamp.

Another object is that of providing for control means in a series-resonance-loaded inverter ballast.

These as well as other objects, features and advantages of the present invention will become apparent from the following description and claims.

BRIEF DESCRIPTION

A self-oscillating half-bridge inverter is powered from a power-line-operated DC voltage source by way of an EMI filter. The inverter is loaded by way of a series-tuned high-Q LC circuit connected across its output. A pair of fluorescent lamps is series-connected across the tank capacitor of the LC circuit.

The inverter has two bipolar transistors, each driven by an associated saturable current transformer that provides for a transistor ON-time dependent upon the magnitude of an associated bias voltage. One of the transistors has a control arrangement connected in circuit with its associated saturable transformer and operative to control the magnitude of its associated bias voltage.

As the magnitude of this bias voltage is controlled, the magnitude of the voltage across the tank-capacitor, as well as the magnitude of the current available therefrom, is correspondingly controlled.

The magnitude of the bias voltage is automatically controlled as a function of: (a) the magnitude of the inverter's output current, (b) the magnitude of the voltage present across the tank-capacitor, (c) the magnitude of the current flowing through the lamps, (d) the setting of an adjustment means operative to adjust the amount of light output, (e) a temperature associated with the inverter, and (f) the magnitude of any ground-fault current that might be flowing.

The EMI filter, in addition to doing its regular EMI function, acts to provide a control signal that is a function of any ground-fault current that might be flowing.

A control signal representing the magnitude of the voltage present across the tank-capacitor is obtained by way of an auxiliary winding on the tank-inductor of the LC circuit.

A control signal representing the magnitude of the current flowing through the lamps is obtained by way of a current transformer connected in series with the lamps.

A control signal representing the magnitude of the inverter's output current is present in that the saturable current transformers each draw a current from the source of its associated bias voltage; the magnitude of which current is proportional to that of the inverter's output current.

A control signal representing the amount of light output is provided in the form of the setting of the resistance value of a resistor that acts to reduce the magnitude of the bias voltage.

A control signal signifying the temperature associated with the inverter is derived from a thermistor so disposed as to be exposed to such temperature.

These various control signals are then presented to the control arrangement associated with the one transistor, thereby controlling its associated bias voltage.

DESCRIPTION OF THE PREFERRED EMBODIMENT

Details of Construction

Figures 1, 2:
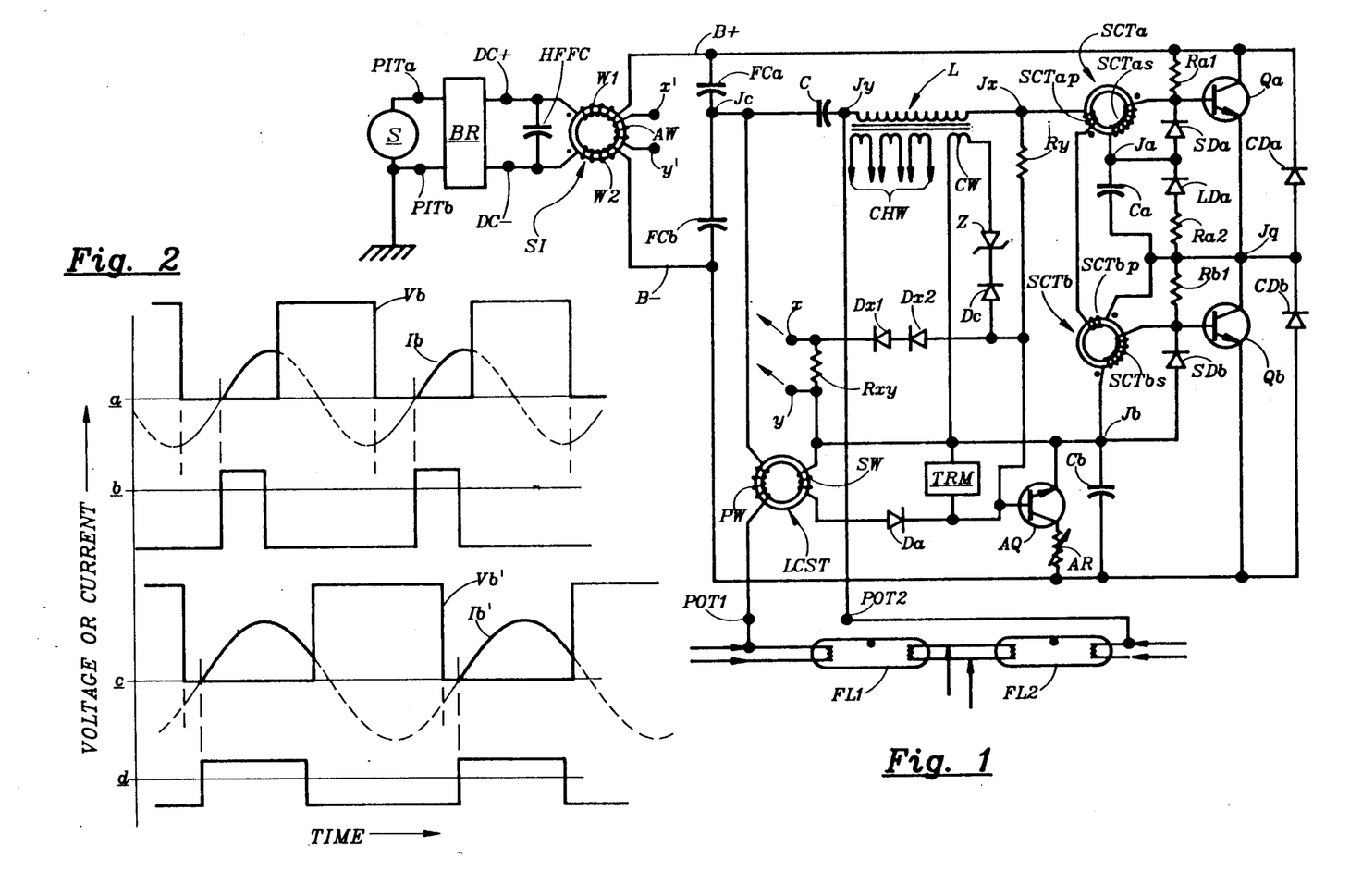
FIG. 1 provides a basic electrical circuit diagram of the preferred embodiment of the invention.
FIG. 2 illustrates waveshapes of various high frequency voltages and currents present within the circuit during different modes of operation.

In FIG. 1, a source S of ordinary 120Volt/60Hz power line voltage is applied to power input terminals PITa and PITb; which terminals, in turn, are connected with a bridge rectifier BR. The DC output from bridge rectifier BR is applied to a DC+ terminal and a DC− terminal, with the DC+ terminal being of positive polarity. A high-frequency filter capacitor HFFC is connected between the DC+ terminal and the DC— terminal. A first winding W1 of an EMI suppression inductor SI is connected between the DC+ terminal and a B+ bus; and a second winding W2 of EMI suppression inductor SI is connected between the DC— terminal and a B— bus.

An auxiliary winding AW is wound on EMI suppression inductor SI; which auxiliary winding has output terminals x' and y'.

A filter capacitor FCa is connected between the B+ bus and a junction Jc; a filter capacitor FCb is connected between junction Jc and the B— bus. A switching transistor Qa is connected with its collector to the B+ bus and with its emitter to a junction Jq; a switching transistor Qb is connected with its collector to junction Jq and with its emitter to the B— bus. A commutating diode CDa is connected between the B+ bus and junction Jq, with its cathode connected with the B+ bus; a commutating diode CDb is similarly connected between junction Jq and the B— bus. A saturable current transformer SCTa has a secondary winding SCTas connected between the base of transistor Qa and a junction Ja; a saturable current transformer SCTb has a secondary winding SCTbs connected between the base of transistor Qb and a junction Jb. Saturable current transformers SCTa and SCTb, respectively, have primary windings SCTap and SCTbp; which primary windings are series-connected between junction Jq and a junction Jx. A resistor Ral is connected between the collector and the base of transistor Qa; a resistor Rbl is connected between the collector and the base of transistor Qb. A capacitor Ca is connected between junction Ja and the emitter of transistor Qa; a capacitor Cb is connected between junction Jb and emitter of transistor Qb. A diode LDa is connected with its cathode to junction Ja and, by way of a leakage resistor Ra2, with its anode to the emitter of transistor Qa. A shunt diode SDa is connected between the base of transistor Qa and junction Ja, with its anode connected with junction Ja; a shunt diode SDb is similarly connected between the base of transistor Qb and junction Jb. An auxiliary transistor AQ is connected with its emitter to junction Jb and with its collector to the B— bus by way of an adjustable resistor AR. A temperature-responsive means TRM is connected between the base and the emitter of transistor AQ. A resistor Ry is connected between junction Jx and the base of transistor AQ.

A tank inductor L is connected between junction Jx and a junction Jy; and a tank capacitor C is connected between junctions Jy and Jc. A power output terminal POT1 is connected with junction Jc by way of a primary winding PW of a lamp current sensing transformer LCST; another power output terminal POT2 is connected directly with junction Jy. First and second fluorescent lamps FL1 and FL2 are series-connected between power output terminals POT1 and POT2. Tank inductor L has three cathode heater windings CHW; which are connected with the cathodes of fluorescent lamps FL1 and FL2.

Tank inductor L also has a control winding CW connected between junction Jb and the anode of a Zener diode Z, whose cathode is connected with the cathode of a diode Dc, whose anode is connected with the base of transistor AQ.

A secondary winding SW of transformer LCST is connected between the emitter of auxiliary transistor AQ and the anode of a diode Da, whose cathode is connected with the base of transistor AQ. A terminal y is connected with junction Jb. A terminal x is connected with the cathode of a diode Dx1, whose anode is connected with the cathode of a diode Dx2, whose anode is connected with the base of transistor AQ. A resistor Rxy is connected between terminals x and y; which terminals are respectively connected with terminals x' and y' of auxiliary winding AW of suppression inductor SI.

Details of Operation

The basic operation of the half-bridge inverter of FIG. 1 is conventional and is explained in conjunction with FIG. 3 of U.S. Pat. No. 4,307,353 to Nilssen.

For a given magnitude of the DC supply voltage, due to the effect of the high-Q LC circuit, the magnitude of the current provided to the fluorescent lamp load (or to any other load presented to the output) is a sensitive function of the frequency and the waveshape of the inverter's output voltage; which output voltage is a squarewave voltage of controllable frequency and with peak-to-peak magnitude about equal to that of the instantaneous magnitude of the DC voltage present between the B— bus and the B+ bus.

The frequency of the inverter's squarewave output voltage is a sensitive function of the natural resonance frequency of the high-Q LC circuit as well as of the duration of the forward conduction period (i.e., the ON-period) of the two inverter switching transistors; which duration, in turn, is a sensitive function of the saturation characteristics of saturable current transformers SCTa and SCTb as combined with the magnitude of the bias voltages present on capacitors Ca and Cb. That is, the duration of the forward conduction period (the ON-time) of each switching transistor is determined by the volt-second product sustainable by its associated saturable current transformer as well as by the magnitude of the negative bias on capacitors Ca and Cb: the higher the volt-second product available before saturation, the longer the ON-time; the higher the negative bias on the Ca/Cb capacitors, the shorter the ON-time.

In the circuit arrangement of FIG. 1, the magnitude of the negative voltage on capacitors Ca and Cb is determined by the magnitude of the current provided to the bases of transistors Qa and Qb, less any current drained away through resistors Ra2 and AR, all respectively. (Of course, a small amount of current is also drained away from bias capacitors Ca and Cb by resistors Ra1 and Rb1/Ry, respectively. However, this amount of charge leakage is in most situations negligible. Resistors Ra1 and Rb1/Ry are principally used for getting the inverter to initiate oscillation.)

The magnitude of the base current provided to each transistor is directly proportional to the magnitude of the current flowing through the primary windings of saturable current transformers SCTa and SCTb. Thus, assuming transistor AQ to be conducting, for given values of resistors Ra2 and AR: the higher the magnitude of the inverter's output current, the higher the magnitude of the negative voltage on capacitors Ca and Cb.

In other words, again assuming transistor AQ to be conducting and given values of resistors Ra2 and AR, the circuit of FIG. 1 provides for a high degree of automatic regulation of the magnitude of the inverter's output current. Moreover, by selecting a suitable resistance value for resistor Ra2, and assuming transistor AQ to be conducting, the magnitude of the inverter's output current may be adjusted by adjusting the resistance value of AR: a relatively low resistance value leads to an inverter output current of relatively high magnitude; a relatively high resistance value leads to an inverter output current of relatively low magnitude.

The higher the magnitude of the negative voltage on each bias capacitor, the higher the magnitude of the voltage that has to be provided from the secondary winding of each saturable current transformer; which, in turn, leads to a correspondingly shorter period before saturation is reached. Thus, as the magnitude of the negative bias on each bias capacitor in increased, the duration of each transistor's forward conduction period (ON-time) is decreased; which, in turn, leads to a reduction in the magnitude of the inverter's output current in comparison with what it otherwise would have been.

Whereas the base current provided to each transistor has to flow from its associated bias capacitor, the reverse or reset current provided from each of the saturable current transformer's secondary windings does not flow from the bias capacitor, but rather flows in a separate path through the reverse shunt diode (SDa or SDb) shunting the secondary winding of each saturable current transformer.

More particularly, the circuit and control arrangement of FIG. 1 operates as follows.

Shortly after power is applied at power input terminals PITa/PITb, the inverter starts to oscillate at a frequency near the natural self-resonance frequency of the LC circuit. The current provided through resistor Ry flows into the base of transistor AQ and makes it conductive, thereby forming a leakage path for the (negative) charge developing on capacitor Cb due to the base current flowing into the base of transistor Qb. (Of course, the combination of diode Da and resistor Ra2 forms a leakage path for the charge developing on capacitor Ca.)

With the fluorescent lamps non-connected or otherwise nonfunctional, the magnitude of the high-frequency (30 kHz or so) voltage developing across the tank-capacitor rapidly increases to a point where current starts flowing from control winding CW, through Zener diode Z and rectifier diode Dc; thereby drawing current away from the base of transistor AQ; thereby, in turn, (i) making transistor AQ non-conductive, (ii) stopping the leakage of charge from capacitor Cb, (iii) increasing the magnitude of the (negative) bias voltage on capacitor Cb, (iv) reducing the ON-time of transistor Qb, and (v) decreasing the magnitude of the inverter's output current. As an overall net result, the magnitude of the high-frequency voltage across the tank-capacitor will be manifestly prevented from exceeding that level which corresponds to a voltage-magnitude across the tank-inductor that, in turn, causes Zener diode Z to conduct, thereby to draw base current away from transistor AQ.

In fact, in the absence of lamp loading, by virtue of the above-indicated control procedure and by suitable choice of the Zener voltage of Zener diode Z, the magnitude of the high-frequency voltage developing across the tank-capacitor will be manifestly limited to (and held to) a level that is exactly suitable for proper starting of the fluorescent lamps.

With functional fluorescent lamps connected, the operation will proceed as indicated above, but only until the lamps ignite; which they will do within about one second after having been connected.

As soon as the lamps ignite, the magnitude of the voltage across tank-capacitor C (as well as across tank-inductor L) decreases to a level too low to cause Zener diode Z to conduct. Moreover, lamp current starts to flow; which lamp current flows through primary winding PW of transformer LCST, thereby providing positive base current to transistor AQ. As an overall net result, transistor AQ will now become conductive.

As long as transistor AQ is conductive, the fluorescent lamps will be powered in a normal manner; and the magnitude of the lamp current flowing will depend on the particular setting of adjustable resistor AR. Thus, adjustable resistor AR constitutes a means for light output adjustment or dimming.

In case of a ground-fault condition—which typically might occur if fluorescent lamp FL2 were to be connected at its one end with power output terminal POT2 while a ground-connected person held onto the lamp's terminals at its other end—high-frequency current would flow out from the ballast at terminal POT2, through the lamp and person to ground, and then eventually back to the ballast by way of one or both of the power input terminals (PITa/PITb. Thus, this ground-fault current would have to flow through one or both of windings W1 and W2 of suppression inductor SI. As a result, a corresponding current would flow out of auxiliary winding AW and into terminals x and y. By way of series-connected diodes Dx1 and Dx2, this current will subtract from the base current of transistor AQ, thereby rendering transistor AQ non-conductive, thereby manifestly limiting the magnitude of this ground-fault current to a level considered by authoritative entities, such as Underwriters Laboratories, Inc. of Northbrook, Illinois, as being substantially non-hazardous.

FIG. 2 depicts various voltage and current waveforms associated with the circuit of FIG. 1.

For a situation with no loading presented to the high-Q LC circuit—that is, with the lamps disconnected, or before the lamps have ignitied—FIG. 2a shows the collector-to-emitter voltage Vb of transistor Qb and the corresponding inverter output current Ib. The part of Ib actually flowing through transistor Qb in the forward direction is shown in heavy solid line, the part of Ib flowing through commutating diode CDb is showed in light solid line, and the part of Ib flowing through either Qa or CDa is shown in light dashed line.

FIG. 2b shows the base-emitter voltage of transistor Qb as it corresponds to the waveforms of FIG. 2a.

For a situation where the LC circuit is substantially fully loaded by the two fluorescent lamps, FIG. 2c shows the collector-to-emitter voltage Vb' of transistor Qb and the corresponding inverter output current Ib'. The part of Ib' actually flowing through transistor Qb in the forward direction is shown in heavy solid line, the part of Ib' flowing through commutating diode CDb is showed in light solid line, and the part of Ib' flowing through either Qa or CDa is shown in light dashed line.

FIG. 2d shows the base-emitter voltage of transistor Qb as it corresponds to the waveforms of FIG. 2c.

Additional Comments (a) Detailed information relative to a fluorescent lamp ballast wherein the fluorescent lamp is powered by way of a series-excited parallel-loaded L-C resonant circuit is provided in U.S. Pat. No. 4,554,487 to Nilssen.

(b) The instantaneous peak-to-peak magnitude of the squarewave output voltage provided by the half-bridge inverter between junctions Jq and Jc is substantially equal to the instantaneous magnitude of the DC supply voltage.

(c) Saturable current transformers SCTa and SCTb require only a miniscule amount of voltage across their primary windings. Hence, the magnitude of the voltage-drop between junctions Jq & Jx is substantially negligible, and the inverter's full output voltage is therefore effectively provided across the LC circuit, which consists of tank capacitor C and tank inductor L.

(d) In FIG. 2, the inverter frequency associated with the waveforms of FIGS. 2a and 2b is somewhat higher than that associated with FIGS. 2c and 2d.

Correspondingly, current Ib is nearly 90 degrees out of phase with the fundamental frequency component of voltage Vb, while current Ib' is almost in phase with voltage Vb'.

(e) In the situation associated with the waveform of FIG. 2b, the magnitude of the bias voltage on bias capacitor Ca and Cb is about three times higher than it is in the situation associated with the waveform of FIG. 2d.

Correspondingly, the duration of the transistor ON-time in the situation associated with FIG. 2d is about twice that of the transistor ON-time in the situation associated with the waveform of FIG. 2b.

(f) As may be noticed in FIG. 2a, transistor Qb ceases to conduct in its forward direction while a substantial amount of current is still flowing in the forward direction. After transistor Qb has ceased to conduct, the forward-flowing current will continue to flow until the energy in the tank inductor has dissipated itself.

However, the current will continue its flow through commutating diode CDa, thereby discharging its energy into the DC power supply.

(g) Forward conduction of a transistor is defined as current flowing, with the aid of forward base drive current, directly between the collector and the emitter; which, in case of transistor Qb for, instance, means that forward current is defined as positive current flowing from its collector to its emitter while drive current is being provided to its base.

A transistor's ON-time is defined as the period during which it conducts current in the forward direction.

(h) For the situations depicted in FIG. 2, the magnitude of the negative bias voltage is substantially the same on both bias capacitors; which implies that the resistance value of adjustable resistor AR (as combined with the effect of transistor AQ, which is conducting in an intermittent manner) is set to be effectively the same as that of resistor Ra2 as combined with its associated diode Da.

However, there is no need for these two resistance values to be the same: quite the contrary. A wide range of inverter power output adjustment is in fact attained by way of adjusting only one of the two effective resistance values—i.e., AR.

With the two resistance values being effectively different, the durations of the ON-times of the associated transistors will be correspondingly different. For instance: the smaller the resistance value of AR, the longer the ON-time associated with transistor Qb; the larger the resistance value of AR, the shorter the ON-time associated with transistor Qb.

(i) In FIG. 2 it is noted that the fundamental frequency of the waveforms depicted in FIGS. 2c and 2d is higher by a certain factor as compared with the frequency associated with the waveforms of FIGS. 2a and 2b; yet the indicated duration of transistor ON-time associated with the waveforms of FIGS. 2a and 2b is shorter by a much larger factor as compared with the indicated duration of transistor ON-time associated with the waveforms of FIGS. 2c and 2d.

In fact, when the transistor ON-time is shortened by a given proportion, the fundamental frequency of the inverter's output voltage increases by a much smaller proportion. In instant case, with each transistor's ON-time shortened by a factor of about two, the inverter frequency increased only by a factor of less than 1.2: from about 30 kHz to just over 35 kHz.

(j) The time constant associated with each bias capacitor and its associated leakage resistance means is normally longer than a complete cycle of the high frequency inverter output voltage, and it is typically on the order of several such complete cycles. For instance, for a situation where the power line input voltage is 120Volt/60Hz, the frequency of the inverter output voltage/current is on the order of 30 kHz, and the total inverter power output falls in the range between 10 and 100 Watt, the values of bias capacitors Ca and Cb might reasonably be in the range from one to ten micro-Farad, the value for leakage resistor Ra2 might reasonably be in the range between 10 and 100 Ohm, and adjustable resistor AR might reasonably be adjustable over a range between 5 and 100 Ohm.

Thus, in general, the magnitude of the bias voltage on the bias capacitors is responsive to the average magnitude of the inverter's output current—normally as averaged over at least a full cycle of this output current.

(k) In case of excessive temperatures, thermally responsive means TRM acts to reduce power output from the inverter by way of removing base current from transistor AQ.

Thermally responsive means TRM is a thermistor means, but it could just as well have been a thermally activated bimetallic switcher means.

(l) In the circuit arrangement of FIG. 1, by properly selecting the operating frequency and the various components affecting the magnitude of the maximum current available from power output terminal POT2 (in the absence of any lamp current flowing through the primary winding PW of transformer LCST)—which components are principally Ra2 and Ry—the maximum magnitude of the current available from power output terminal POT2 may be limited to a level that would be considered substantially non-hazardous with respect to electric shock potential.

The maximum magnitude of current considered substantially non-hazardous with respect to electric shock potential increases with frequency: being about 30 milli-Ampere RMS at 10 kHz; 90 milli-Ampere RMS at 30 kHz; and 120 milli-Ampere RMS at 40 Kz.

Thus, by properly selecting the resistance values of resistors Ra2 and Ry, protection from serious shock hazard due to a ground-fault situation is provided.

A ground-fault situation occurs whenever a ground-connected person holds onto the terminals at one end of a fluorescent lamp while inserting the other end into the lamp socket connected with power output terminal POT2. In that case, a ground-fault current will flow through the person, to ground, and from ground to the power line conductors, and therefrom back to the inverter by way of power input terminals PITa/PITb and rectifier means BR. However, as long as no lamp current flows through primary winding PW of transformer LCST, the maximum current that can be delivered from power output terminal POT2 is—at the 30–35 kHz frequency associated with the circuit arrangement of FIG. 1—limited to being essentially nonhazardous with respect to producing an electric shock.

The POT2 terminal is designated the "hot" terminal; while the POT1 terminal is designated as the "cold" terminal. If a ground-connected person were to touch the POT1 or the "cold" terminal he would normally not be exposed to a shock hazard.

(m) On the other hand, if the frequency of the inverter means is chosen to be relatively low, thereby reducing the magnitude of non-hazardous ground-fault current, electric shock hazard is never-the-less prevented by means of the auxiliary winding AW on suppression inductor SI. That is, the circuit arrangement of FIG. 1 provides for a redundant shock protection feature.

More particularly, in the event of a ground-fault situation, the negative base current provided to transistor AQ (due to the output from auxiliary winding AW) is sufficient to make transistor AQ non-conductive to a degree sufficient to cause the magnitude of the current available from power output terminal POT2 to be limited to such a degree as not to exceed the maximum non-hazardous magnitudes for ground-fault current.

(n) With power input terminals PITa and PITb connected with an ordinary electric utility power line, all electrical parts of the circuit arrangement of FIG. 1 are effectively in connection earth ground by way of those power input terminals.

(o) Although not expressly shown in FIG. 1, it is emphasized that fluorescent lamps FL1 and FL2 are connected with terminals POT1 and POT2 by way of lamp socket means of a type that has electrical terminal means that are non-accessible to a person's fingers or the like. However, the terminal means of the fluorescent lamps are of a type that does permit a person to touch them directly, provided they are not inserted into their sockets.

Thus, in a situation where the circuit arrangement of FIG. 1 is used as a fluorescent lamp ballasting means, and under otherwise ordinary circumstances, the only way that a person is able to get exposed to a ground-fault current from the circuit arrangement of FIG. 1 is by holding on to the terminals at one of end of a fluorescent lamp while inserting the other end into a lamp socket connected with the POT2 or the "hot" terminal.

(p) In the circuit arrangement of FIG. 1 there are two distinctly different kinds of current-magnitude-limiting provided. One is the ordinary kind associated with the natural characteristics of a series-excited parallel-loaded resonant LC circuit; another is due to the action of the control circuit associated with auxiliary transistor AQ.

The former is the principal means for limiting the lamp current; the latter is the principal means for limiting the output current in the absence of proper circuit loading.

(q) Due to basic factors related to magnetic hysteresis and leakage iductance, lamp current sensing transformer LCST requires the lamp current to have a certain minimum magnitude before producing an output signal of magnitude adequate to cause auxiliary transistor AQ to become conductive. Hence, there is a minimum threshold level automatically built into the control means used for sensing lamp current. This threshold level may readily be changed, for instance by changing the number of turns on primary winding PW, or by placing a shunting impedance across secondary winding SW.

(r) In the control circuit related to and including auxiliary transistor AQ, there are to main control effects: (i) one associated with the fact that the magnitude of the bias voltage on capacitor Cb tends to vary around an average level as a function of the average absolute magnitude of the inverter's output current, and (ii) one associated with the fact that the average level around which the bias voltage varies may itself be varied, such as by varying the magnitude of the base current provided to auxiliary transistor AQ.

(s) Without any substantial loading on the LC circuit, its Q-factor is quite high, and—absent proper control measures —the magnitude of the voltage developing across the tank-capacitor tends to become destructively high.

A large-magnitude voltage across the tank-capacitor must by necessity be associated with an inverter output current of correspondingly large magnitude. However, a large-magnitude inverter output current will cause a correspondingly high-magnitude negative bias on both bias capacitors, but—absent lamp current of magnitude sufficient to place transistor AQ into conduction—particularly on bias capacitor Cb: the two bias capacitors have to provide a positive current of magnitude proportional to the average absolute magnitude of the inverter's output current; which means that the magnitude of the negative bias voltage will have to increase with increasing magnitude of the inverter output current.

It is this negative feedback feature, which relates to negative feedback of the rectified average magnitude of the inverter's output current, that provides for stable controllable operation of a self-oscillating inverter whose output is connected across an unloaded high-Q series-connected LC circuit (t) In fact, the circuit arrangement of FIG. 1 may be defined as an inverter that is loaded by way of a high-Q tuned LC circuit and arranged to self-oscillate by way of positive feedback derived from the inverter's instantaneous output current and/or voltage) while at the same time arranged to provide for controllable-magnitude output current (and/or voltage) by way of negative feedback derived from the average absolute magnitude of the inverter's output current (and/or voltage).

(u) With reference to FIG. 2, it is seen that at the moment of turn-off, the magnitude of the reverse-voltage provided at the base of the Qb switching transistor is larger for a larger magnitude of the current flowing through the transistor at the moment the reverse voltage is initially provided.

Thus, we have a situation where the magnitude of the transistor reverse turn-off voltage is increasing with the magnitude of the transistor current at the moment of turn-off; which situation is highly advantageous for efficient switching.

(v) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
   a DC source operative to provide a DC voltage at a set of DC terminals; and
   inverter means connected with the DC terminals and operative on a substantially continuous basis to provide a high-frequency voltage between a first terminal means and a second terminal means; the first terminal means being electrically connected with earth ground; the inverter means having control means responsive to high-frequency current flowing from the first terminal means and operative, but only as long as substantially no high-frequency current is flowing from the fist terminal means, to limit the magnitude of any high-frequency current that might be flowing from the second terminal means to earth ground to a level that would be considered substantially safe from imparting a hazardous electric shock to a human being;

whereby a person coming in contact with the second terminal means would be protected against receiving a hazardous electric shock even if: (i) that person were to have electrical connection with earth ground, provided this electrical connection be by way of a connection means other than said first terminal means; and (ii) the high-frequency voltage is still being provided on a continuous basis.

2. The arrangement of claim 1 combined with: (i) load means connected between the first and the second terminal means, thereby to cause a high-frequency current to flow from the first terminal means as well as from the second terminal means, and (ii) current sensing means connected in circuit with the first terminal means and the control means, the current sensing means being operative in response to any current flowing from the first terminal means to cause the inverter means to limit the magnitude of any high-frequency current that might now be flowing out of the second terminal means to a level higher than that considered substantially safe from imparting a hazardous electric shock hazard to a human being.

3. The arrangement of claim 2 wherein the load means is an electric lamp means.

4. The arrangement of claim 3 wherein the inverter means is operative to limit the magnitude of any current flowing from the first terminal means to a level appropriate for operating the electric lamp means.

5. An arrangement comprising:
an electric utility power line having power line conductors electrically connected with earth ground;
a power conditioner means connected with the electric utility power line and operative to provide a DC voltage at a set of DC terminals; and
inverter means connected with the DC terminals and operative to provide a high-frequency AC voltage between a first output terminal means and a second output terminal means; there being an electrically conductive path between the first terminal means and earth ground, which electrically conductive path goes through the power conditioner means to the electric utility power line; the inverter means having control means responsive to high-frequency current flowing from the first terminal means and operative to limit the magnitude of any high-frequency current flowing from the second terminal means from exceeding a certain predetermined magnitude except when high-frequency current is also flowing from the first terminal means.

6. The arrangement of claim 5 wherein: (i) any high-frequency current supplied from the second terminal means, in a case where high-frequency current is not flowing from the first terminal means, is effectively supplied through a relatively high source impedance, and (ii) any high-frequency current supplied from the second terminal means, in a case where high-frequency current is indeed flowing from the first terminal means, is effectively supplied through a relatively low source impedance;
such that the magnitude of any high-frequency current supplied to a load connected between the first terminal means and the second terminal means may be substantially larger than the magnitude of any high-frequency current supplied to a load connected between the second terminal means and earth ground.

7. The arrangement of claim 6 combined with a gas discharge lamp means connected in circuit between the first terminal means and the second terminal means.

8. The arrangement of claim 5 wherein the inverter means comprises tuned LC circuit means connected in circuit with the first and second terminal means, the tuned LC circuit means having a natural resonance frequency at or near the fundamental frequency of the AC voltage.

9. The arrangement of claim 8 wherein the LC circuit means comprises tank-capacitor means effectively connected across the first and the second terminal means.

10. The arrangement of claim 5 wherein, with reference to earth ground: (i) a high-frequency voltage of a first magnitude exists at the first terminal means, (ii) a high-frequency voltage of a second magnitude exists at the second terminal means, and (iii) the second magnitude is substantially larger than the first magnitude.

11. An arrangement comprising:
an electric utility power line having power line conductors electrically connected with earth ground;
a power conditioner means connected with the electric utility power line and operative to provide a DC voltage at a set of DC terminals; and
inverter means connected with he DC terminals and operative to provide a substantially squarewave voltage across a pair of squarewave terminals; a series-combination of a tank-inductor and a tank-capacitor being effectively connected across the squarewave terminals; the tank-capacitor having a first and a second terminal means; a high-frequency substantially sinusoidal AC voltage being provided between the first and the second terminal means; there being an electrically conductive path between the first terminal means and earth ground by way of the power conditioner means; the inverter means having control means responsive to high-frequency current flowing from the first terminal means and operative: (i) to prevent the magnitude of the AC voltage from exceeding a first predetermined level, and (ii) to prevent the magnitude of any high-frequency current flowing from the second terminal means from exceeding a second predetermined level, except if high-frequency current is also flowing from the first terminal means;
such that, as long as substantially no high-frequency current is flowing from the first terminal means, the magnitude of any high-frequency current flowing from the second terminal means to earth ground is prevented from exceeding said second predetermined level, even though high-frequency substantially sinusoidal Ac voltage is still being provided between the first and the second terminal means.

12. A combination comprising:
an AC source providing a substantially sinusoidal Ac voltage at an AC output; the AC source having an internal impedance operative to limit the flow of Ac current from its Ac output; the AC source also having a control means operative, on receipt of a control action, to affect the effective magnitude of the internal impedance; and load means disconnectably connected with the Ac output; the load means having detection means responsive to the flow of Ac current through the load means; the detection means being connected with the control means and operative to provide said control action whenever AC current of magnitude in excess of a predetermined level flows through the load means;

the combination functioning such that; (i) whenever the magnitude of any AC current flowing through the load means fails to exceed said predetermined level, the magnitude of the internal impedance is relatively high, and (ii) whenever the magnitude of any AC current flowing through the load means does exceed said predetermined level, the magnitude of the internal impedance is relatively low.

13. The combination of claim 12 wherein (i) the AC output has a first terminal means and second terminal means, (ii) the load means is connected between the first and the second terminal means, and (iii) the detection means is responsive to AC current flowing from the first terminal means but is non-responsive to AC current flowing from the second terminal means.

14. A combination comprising:
a DC source providing a DC voltage at a set of DC terminals;

inverter means connected with the DC terminals and operative to provide a continuously present high-frequency AC voltage at an AC output; the inverter means having a control input means; the AC output being connected with a first AC terminal means and a second AC terminal means; the AC output exhibiting a relatively high internal impedance to the flow of high-frequency current except when provided with a certain control action at the control input means, in which case the AC output exhibits a substantially lower internal impedance to the flow of high-frequency current;

lamp means disconnectably connected in circuit with the first and second AC terminal means by way of a lamp current detection means; the lamp means—when indeed so connected—being operative to draw a lamp current from these terminal means; the lamp current detection means being connected with the control input means and operative to provide said control action whenever the magnitude of the lamp current means exceeds a certain predetermined magnitude;

whereby, without causing a substantial change in the fundamental frequency of the high-frequency AC voltage, the magnitude of said relatively high internal impedance decreases by a substantial degree whenever the lamp means is indeed connected and operative to draw lamp current in excess of said predetermined magnitude.

15. The combination of claim 14 wherein the lamp means comprises a gas discharge lamp.

16. The combination of claim 14 wherein, if a lamp means were not to be connected in circuit with the first and second AC terminal means, the magnitude of any high-frequency current flowing from said second AC terminal means would be limited by way of said relatively high internal impedance to a certain relatively low level.

17. The combination of claim 16 wherein said relatively low level magnitude of high-frequency current is so low as not to represent a significant electric shock hazard to a person being exposed thereto.

18. A combination comprising:
inverter means connected with a DC voltage source and operative to provide a substantially squarewave voltage across a pair of inverter output terminals; the squarewave voltage having a fundamental frequency; the inverter means having a first transistor means with a first drive input connected in circuit with said inverter output terminals, thereby via positive feedback being operative to sustain inverter operation; the inverter operation being characterized by the first transistor means periodically and alternatingly, at a frequency equal to said fundamental frequency, switching into and out of a first state of forward conduction; the first state of forward conduction having a first duration; the inverter means also having a second transistor means connected in circuit with the first transistor means and switched into and out of a second state of forward conduction; the second state of forward conduction having a second duration;

LC circuit series-connected across the inverter output terminals; the LC circuit having a tank-capacitor and a tank-inductor operative to resonantly interact at or near said fundamental frequency; a substantially sinusoidal current being drawn by the LC circuit from the inverter output terminals; a substantially sinusoidal AC output voltage developing across the tank-capacitor; the AC output voltage having a magnitude that, in the absence of a manifest limiting action, is apt to become excessively large; and control means connected in circuit with said first transistor means and operative to control the extent of said first duration without substantially affecting said second duration, thereby to provide said manifest limiting action;

such that, even in the absence of a load being connected with the LC circuit, the magnitude of the Ac output voltage is prevented from becoming excessively large 19. The combination of claim 18 wherein the control means is operative to provide said limiting action by controlling the magnitude of said substantially sinusoidal current.

20. The combination of claim 18, wherein the inverter means has a second transistor means with a second drive input connected in circuit with said inverter output terminals; the second transistor means periodically and alternatingly, at a frequency equal to said fundamental frequency, switching into and out of a second state of forward conduction; the second state of forward conduction having a second duration and occurring at times other than when the first transistor means is in its first state of forward conduction.

21. The combination of claim 20 wherein the control means is operative to control the extent of said first duration substantially without affecting the extent of said second duration.

22. The combination of claim 21 wherein the control means is operative to lengthen said first duration in the event that a load means be connected across the tank-capacitor.

23. A combination comprising:
inverter means connected with a DC voltage source and operative to provide a substantially squarewave voltage across a pair of inverter output terminals; the squarewave voltage having a fundamental frequency; the inverter means having a first transistor means with a first drive input connected in circuit with said inverter output terminals, thereby via positive feedback being operative to sustain inverter operation; the inverter operation being characterized by the first transistor means periodically and alternatingly, at a frequency equal to said fundamental frequency, switching into and out of a first state of forward conduction; the first state of forward conduction having a first duration;
an unloaded high-Q LC circuit series-connected across the inverter output terminals; the LC circuit having a tank-capacitor and a tank-inductor operative to resonantly interact at or near said fundamental frequency; a substantially sinusoidal current being drawn by the unloaded high-Q LC circuit from the inverter output terminals; the substantially sinusoidal current having a magnitude that, in the absence of a control action, is apt to become excessively large; and
control means connected in circuit with said first transistor means and operative to control the extent of said first duration, thereby to provide said control action substantially without affecting said fundamental frequency.

24. The combination of claim 23 wherein: (i) the inverter means is electrically connected with earth ground; (ii) the tank-capacitor and the tank-inductor are electrically connected together at an electrically hot output terminal; and (iii) as long as the high-Q LC circuit remains otherwise unloaded, the control means is additionally operative to limit the magnitude of any current flowing between earth ground and the electrically hot output terminal to be less than a certain predetermined level.

25. The combination of claim 24 wherein said certain predetermined level is so low as to represent substantially no electric shock hazard to a person who might become electrically connected in circuit between earth ground and the LC circuit output terminal.

26. The combination of claim 23, wherein: (i) the inverter means is electrically connected with earth ground, (ii) the tank-capacitor and the tank-inductor are electrically connected together at an electrically hot terminal, the hot terminal having a relatively high-magnitude AC voltage with respect to earth ground, (iii) the tank-capacitor and the tank-inductor are also connected in circuit with an electrically cold terminal, the cold terminal having a relatively low-magnitude AC voltage with respect to earth ground, and (iv) a load means is connected between the cold terminal and the hot terminal.

27. The combination of claim 26 wherein the control means has prevention means connected in circuit with said cold terminal and operative, in response to AC current flowing therefrom, to prevent the control means from providing said control action.

28. The combination of claim 23 wherein the inverter means comprises a second transistor means with a second drive input connected in circuit with said inverter output terminals; the second transistor means periodically and alternatingly, at a frequency equal to said fundamental frequency, switching into and out of a second state of forward conduction, the second state of forward conduction having a second duration and occurring at times other than when the first transistor means is in its first state of forward conduction.

29. The combination of claim 28 wherein, as long as the high-Q LC circuit remains substantially unloaded, the second duration is substantially longer than the first duration.

30. An arrangement comprising:
inverter means connected with a DC voltage source and operative to provide a substantially squarewave voltage across a pair of inverter output terminals; the squarewave voltage having a fundamental frequency; the inverter means having a transistor means with a drive input connected in circuit with said inverter output terminals, thereby via positive feedback being operative to sustain inverter operation; the inverter operation being characterized by the transistor means periodically and alternatingly, in response to a drive signal provided at said drive input and at a frequency equal to said fundamental frequency, switching into and out of a state of forward conduction; the state of forward conduction having a duration; said fundamental frequency being substantially constant;
load circuit means connected with the inverter output terminals, the load circuit means being operative to draw a load current from the inverter output terminals; and
control means connected in circuit with the inverter output terminals as well as with the drive input; the control means being operative, in response to a change in the average absolute magnitude of the load current, to control the extent of said duration; thereby to control the average absolute magnitude of the load current such as to cause this average absolute magnitude to tend not to deviate substantially from a predetermined level, yet without causing a substantial change in said fundamental frequency.

31. The arrangement of claim 30, wherein the control circuit means is operative to shorten said duration in response to an increase in said average absolute magnitude.

32. The arrangement of claim 30 wherein the control circuit means has an auxiliary means operative, on receipt of a control action, to cause the average absolute magnitude to tend not to deviate substantially from a level different from said predetermined level.

33. The arrangement of claim 30 wherein the control circuit means has an auxiliary means operative, on receipt of a control action, to change said predetermined level.

34. The combination of claim 30 wherein the load circuit means comprises a high-Q LC circuit effectively series-connected across the inverter output terminals and operative to resonate at or near said fundamental frequency.

35. An arrangement comprising:
a DC voltage provided at a set of DC terminals; and
inverter means connected with the DC terminals and operative to provide a high-frequency current from an inverter output; the inverter comprising at least one switching transistor means having a control input to which is applied a periodically alternating switching voltage, thereby causing the switching transistor means periodically and alternatingly to switch between an ON-state and an OFF-state; the ON-state being defined as a state during which the switching transistor means permits forward conduction of current; the OFF-state being defined as a state during which the switching transistor means prevents forward conduction of current; the switching voltage being of a first magnitude during periods when the switching transistor means exists in its ON-state and of a second magnitude during periods when the switching transistor means exists in its OFF-state; the second magnitude, when compared with a given voltage reference level, being: (i) of polarity opposite to that of the first magnitude, and (ii) dependent upon the magnitude of the current being forwardly conducted by the switching transistor means just prior to the moment at which it switches from its ON-state to its OFF-state, such that the second magnitude increases with increasing magnitude of the current conducted by the switching transistor means just prior to said moment.

36. The arrangement of claim 35 combined with positive feedback means connected in circuit between the inverter output and the control input; the positive feedback means being operative to cause inverter operation to occur.

37. The arrangement of claim 35 wherein the switching transistor means comprises a bi-polar transistor means.

38. An arrangement comprising:
a DC voltage provided at a set of DC terminals; and
inverter means connected with the DC terminals and operative to provide an AC voltage at an output; the AC voltage having a period; the inverter means having: (i) a transistor means operative to switch periodically between an ON-state and an OFF-state, the OFF-state having an OFF-state duration; and (ii) control means connected in circuit with the output as well as with the transistor means, the control means being operative to permit control of the OFF-state duration, thereby to cause the OFF-state duration as well as said period to change, said period changing by a proportion that is substantially less than the proportion by which the OFF-state duration is changed.

39. An arrangement comprising:
a DC voltage provided at a set of DC terminals; and
inverter means connected with the DC terminals and being operative to provide an AC voltage at an AC means having a first transistor means a second transistor means; the first transistor means being operative to switch periodically between a first ON-state and a first OFF-state; the second transistor means being operative to switch periodically between a second ON-state and a second OFF-state; the first ON-state occurring only at times when the second transistor means is in its OFF-state; the second ON-state occurring only at times when the first transistor is in its OFF-state; the inverter means having control means operative to permit control of the duration of the first ON-state without significantly affecting the duration of the second ON-state.

40. The arrangement of claim 39 wherein: (i) the AC output is operative to provide an output current having a magnitude that is prevented from exceeding a predetermined level; and (ii) a gas discharge lamp means is connected with the AC output.

41. The arrangement of claim 39 wherein the inverter means comprises a tuned LC circuit means connected with the AC output.

42. The arrangement of claim 39 combined with first means connected in circuit with the control means and operative to permit manual adjustment of the duration of the first ON-state.

43. The arrangement of claim 39 combined with second means connected in circuit with the control means and responsive to a temperature associated with the inverter means; the second means being operative to cause a shortening of the duration of the first ON-state in response to an increase in said temperature.

44. The arrangement of claim 39 combined with third means connected in circuit with the control means and responsive to an output current flowing from the AC output; the third means being operative, in response to said current, to change the duration of the first ON-state.

45. The arrangement of claim 39 combined with fourth means connected in circuit with the second transistor means and operative to control the duration of the second ON-time as a function of the magnitude of a current flowing through the second transistor means.

* * * * *

UNITED STATES PATENT AND TRADEMARK OFFICE
CERTIFICATE OF CORRECTION

PATENT NO. : 5,039,919

DATED : August 13, 1991

INVENTOR(S) : Ole K. Nilssen

It is certified that error appears in the above-identified patent and that said Letters Patent is hereby corrected as shown below:

Claim 39 should read as follows:

39. An arrangement comprising:

a DC voltage provided at a set of DC terminals; and inverter means connected with the DC terminals and being operative to provide an AC voltage at an AC output; the inverter means having a first transistor means and a second transistor means; the first transistor means being operative to switch periodically between a first ON-state and a first OFF-state; the second transistor means being operative to switch periodically between a second ON-state and a second OFF-state; the first ON-state occurring only at times when the second transistor means is in its OFF-state; the second ON-state occurring only at times when the first transistor means is in its OFF-state; the inverter means having control means operative to permit control of the duration of the first ON-state without

UNITED STATES PATENT AND TRADEMARK OFFICE
CERTIFICATE OF CORRECTION

PATENT NO. : 5,039,919
DATED : 08/13/91
INVENTOR(S) : Ole K. Nilssen

It is certified that error appears in the above-identified patent and that said Letters Patent is hereby corrected as shown below:

significantly affecting the duration of the second ON-state.

Signed and Sealed this

Twentieth Day of January, 1998

Attest:

BRUCE LEHMAN

Attesting Officer

Commissioner of Patents and Trademarks